(12) United States Patent
Qu et al.

(10) Patent No.: US 10,554,760 B2
(45) Date of Patent: Feb. 4, 2020

(54) METHOD AND NETWORKING EQUIPMENT FOR ACQUIRING FEATURE INFORMATION

(71) Applicant: Xiaomi Inc., Beijing (CN)

(72) Inventors: Heng Qu, Beijing (CN); Yu Guo, Beijing (CN); Guizhen Yang, Beijing (CN); Jialin Fan, Beijing (CN); Jiajin Yin, Beijing (CN)

(73) Assignee: XIAOMI INC., Beijing (CN)

( * ) Notice: Subject to any disclaimer, the term of this patent is extended or adjusted under 35 U.S.C. 154(b) by 1085 days.

(21) Appl. No.: 14/481,891

(22) Filed: Sep. 9, 2014

(65) Prior Publication Data

US 2015/0095369 A1 Apr. 2, 2015

Related U.S. Application Data

(63) Continuation of application No. PCT/CN2014/077397, filed on May 13, 2014.

(30) Foreign Application Priority Data

Sep. 29, 2013 (CN) .......................... 2013 1 0456266

(51) Int. Cl.
*H04L 29/08* (2006.01)
(52) U.S. Cl.
CPC ................. *H04L 67/141* (2013.01)
(58) Field of Classification Search
CPC ........ G06F 17/30; H04L 67/141; H04L 69/24
USPC ........................................................ 707/694
See application file for complete search history.

(56) References Cited

U.S. PATENT DOCUMENTS

| 7,010,002 B2 * | 3/2006 | Chow | H04L 12/2801 370/485 |
| 7,454,606 B2 * | 11/2008 | Marquiz | G06F 11/0748 713/1 |
| 7,657,594 B2 * | 2/2010 | Banga | G06F 17/30867 709/203 |

(Continued)

FOREIGN PATENT DOCUMENTS

| CN | 1428984 A | 7/2003 |
| CN | 1505338 A | 6/2004 |

(Continued)

OTHER PUBLICATIONS

"European Search Report for 14180252.0-1853".
"International Search Report for PCT/CN2014/077397".

*Primary Examiner* — Huawen A Peng
(74) *Attorney, Agent, or Firm* — Jun He Law Offices P.C.; James J. Zhu (57) ABSTRACT

The present disclosure provides a method and networking equipment for acquiring feature information. It relates to a field of computer and communication technology to acquire the device information using the networking equipment such as a router and to send the device information to other users. The method may include: receiving a network connection request sent from a first terminal device; acquiring device information of the first terminal device in response to the received network connection request; determining the feature information of the first terminal device based on the acquired device information; and outputting the determined feature information.

16 Claims, 8 Drawing Sheets

(56) References Cited

U.S. PATENT DOCUMENTS

| | | | |
|---|---|---|---|
| 8,112,114 B2 * | 2/2012 | Bubien, Jr. | H04M 1/2535 455/556.1 |
| 2003/0197722 A1 † | 10/2003 | Sugauchi | |
| 2003/0225893 A1 * | 12/2003 | Roese | G01S 5/02 709/227 |
| 2004/0003292 A1 | 1/2004 | Kato | |
| 2004/0092231 A1 | 5/2004 | Ayatsuka et al. | |
| 2005/0038906 A1 * | 2/2005 | Banes | H04L 29/06 709/238 |
| 2006/0164679 A1 † | 7/2006 | Kim | |
| 2008/0049779 A1 * | 2/2008 | Hopmann | H04L 12/2807 370/431 |
| 2009/0240924 A1 * | 9/2009 | Yasaki | G06F 9/45558 712/220 |
| 2010/0020681 A1 * | 1/2010 | Nakashima | H04L 12/4625 370/229 |
| 2010/0107215 A1 * | 4/2010 | Bechtel | H04L 63/105 726/1 |
| 2011/0307490 A1 * | 12/2011 | Chow | G06F 17/30867 707/741 |
| 2012/0131206 A1 | 5/2012 | Shunji | |
| 2012/0317266 A1 * | 12/2012 | Abbott | G06Q 30/0278 709/224 |
| 2014/0122871 A1 * | 5/2014 | Yu | G06F 21/6218 713/156 |

FOREIGN PATENT DOCUMENTS

| | | |
|---|---|---|
| CN | 101945390 A | 1/2011 |
| CN | 102204307 A | 9/2011 |
| CN | 103475577 A | 12/2013 |
| CN | 103532938 A | 1/2014 |
| JP | 2004013273 A | 1/2004 |
| WO | 2013036651 A1 | 3/2013 |

\* cited by examiner
† cited by third party

METHOD AND NETWORKING EQUIPMENT FOR ACQUIRING FEATURE INFORMATION

CROSS REFERENCE TO RELATED APPLICATION

The present application is a Continuation of International Application No. PCT/CN2014/077397, filed May 13, 2014, which is based upon and claims the priority of Chinese patent application No. 201310456266.2, filed on Sep. 29, 2013, the entire content of which is incorporated herein by reference.

TECHNICAL FIELD

The present disclosure relates to a field of computer and communication technology, and more particularly, to a method and a networking equipment for acquiring the feature information.

BACKGROUND

Along with the development of telecommunication and the Internet, network has been ubiquitously used in related technologies to enhance the information communication and improve people's life quality.

One of the important devices in the Internet is router, which is a device for the network to connect to the local area network and the wide area network in the Internet. It is the device that in accordance with channel conditions can automatically select and set a route to sequentially send signals depending on an optimum path. A router is a hub or a "traffic police" of the Internet. As routers being extensively used in various industries, products of a variety of qualities have become the main force of connecting internal network to backbone network, and to the Internet. Moreover, router are not only used in the public network, but also start to be used in household following a development of electronic devices with Internet functions.

For a wireless router used in household, it may be connected by a terminal network device not belonging to the family member. At this time, the owner of the router may want to filter these unidentified terminal devices. On the other hand, a guest of the family may need to connect her terminal devices to the wireless router, wherein the owner may want the router to allow the access of these devices. However, the owner may not be able to distinguish the unidentified terminal devices from the terminal devices belong to the guest.

SUMMARY

The present disclosure provide a method and networking equipment for acquiring feature information for utilizing the use of network.

One aspect of the present disclosure discloses a method for acquiring feature information. The method may include: receiving a network connection request sent from a first terminal device; acquiring device information of the first terminal device in response to the received network connection request; determining feature information of the first terminal device based on the acquired device information; and outputting the determined feature information.

The second aspect of the present disclosure provides a networking equipment for acquiring feature information. The networking equipment may include: a memory; and one or more programs stored in the memory, wherein the one or more programs are configured to be executed by one or more processors, and include instructions of performing the following operations: receiving a network connection request sent from a first terminal device; acquiring device information of the first terminal device in response to the received network connection request; determining feature information of the first terminal device based on the acquired device information; and outputting the acquired feature information.

The third aspect of the present disclosure provides a non-transitory storage medium having stored therein instructions that, when executed by one or more processors of a networking equipment, causes the networking equipment to perform: receiving a network connection request sent from a first terminal device; acquiring device information of the first terminal device in response to the received network connection request; determining feature information of the first terminal device based on the acquired device information; and outputting the acquired feature information.

It should be understood that both the above general descriptions and the detailed description hereinafter are only for exemplary and illustrative purposes, rather than to limit the present disclosure.

BRIEF DESCRIPTION OF THE DRAWINGS

The present disclosure will be described in more detail by the accompanying drawings illustrated herein. The accompanying drawings are a part of the present application, but are not a limitation for the present disclosure. The drawings are as following.

The embodiments of the present disclosure are illustrated by the accompanying drawings above. The present disclosure hereinafter will be described in more detail.

These accompanying drawings and descriptions are only for exemplary embodiments and illustrative purposes to illustrate the concept of the present disclosure for those skilled in the art, rather than to limit the present disclosure.

DESCRIPTION OF THE EMBODIMENTS

In order to clarify the objects, technical solutions and advantages of the embodiments of the present disclosure, the embodiments and drawings are incorporated into the detail description for illustrating the present disclosure hereinafter. The exemplary embodiments and descriptions are used to illustrate the present disclosure, but are not as the limitation for the present disclosure.

According to an embodiment, the present disclosure provides a method for acquiring feature information, which will be given detailed descriptions with reference to the accompanying drawings.

The present disclosure can acquire the feature information of the first terminal device using the procedure of network connection, and output the acquired feature information to the users. It can be convenient for users to recognize the first terminal devices connected to the network to implement some processes related to the first terminal device such as the processes enabling or refusing the network connection of the first terminal device.

In an embodiment illustrated in FIG. 1, the method for acquiring the feature information including the steps described as below.

The step 101 is to receive a network connection request from a first terminal device.

The step 102 is to analyze the received network connection request to acquire device information of the first terminal device in response to the received network connection. The device information can include: MAC address information. The device information may further include other information that can represent the unique identification of the devices. As the device information generally cannot be recognized by users, the device information needs to b transformed into feature information that can be recognized by users.

The medium/media access control (MAC) address, or MAC address and physical address, represents an identifier of each site in the Internet. The MAC address consists of six bytes of hexadecimal or 48-bits. The first three bytes are codes (high order 24 bits) for different venders, which is also called organizationally unique identifier that is distributed by the Registration Authority (RA) of the Institute of Electrical and Electronics Engineers (IEEE). The last three bytes (low order 24 bits) is an adapter port assigned by each vender, called extended unique identifier (uniqueness). An address block can generate 2^24 different addresses. MAC address is an adapter address or an adapter identifier EUI-48.

The step 103 is to determine the feature information of the first terminal device based on the acquired device information. The feature information may include one or more items of user name information, operation system information, brand information, equipment type information, manufacturer information, usage information, and application name information. The feature information may further include the other information related to the first terminal devices to allow other users to recognize the user utilizing the first terminal device. On balance, the feature information can be used as identification information to identify the first terminal device.

The step 104 is to output the determined feature information.

The method according to the embodiment of the present disclosure can be implemented using networking equipment, such as a router. In the process of the network connection between the first terminal device and the router, the router can acquire the feature information of the first terminal device and output the feature information, thereby allow other users, especially the owner of the router, to easily know which terminal device is accessing the network and to whom the terminal device belong. It is convenient for the owner of the router to decide whether to enable the network connection between other terminal device and the router.

In the step 103, there are many methods for implementing the step of determining the feature information of the first terminal device based on the acquired device information.

For instance, according to Mode A1, the steps of determining the feature information comprises: establishing a network connection with the first terminal device on the basis of the device information; determining a port which the first terminal device accesses; and searching a database storing preset nexuses between ports and feature information to determine the feature information of the first terminal device based on the port which the first terminal device accesses.

Different operation systems usually contain their featured applications. Each application generally has fixed access port. The port which the stationary applications usually use is recorded in advance in the present embodiment. Through a corresponding nexus between the operation system and the stationary applications, and a corresponding nexus between the stationary applications and the port which is often used, a corresponding nexus between the port and the operation system can be established. The operation system in a terminal device is fixed. Therefore, a terminal device contains its featured applications and will access specific port after it connects to the router. Thus, the brand information, the equipment type information, and the manufacturer information can be determined by determining the operation system installed in the terminal device using port which the terminal device accesses. For instance, the operation system X1 is developed by the company Y1, applied to the smartphone of Z1 brand; therefore, Y1 and Z1 can be determined on the basis of X1.

After searching a database storing preset nexuses between ports and feature information to determine the feature information of the first terminal device based on the port which the first terminal device accesses, final feature information for the first terminal device is distributed based on the determined feature information. In the present disclosure the final feature information may be distributed using the directly acquired feature information. It may be an ease and accuracy in user's identification compared with the directly acquired feature information.

Alternatively, according to Mode A2, the steps of determining the feature information comprises: searching a database storing preset nexuses between ports and feature information to determine the feature information of the first terminal device based on the port which the first terminal device accesses. In this embodiment the nexus can be acquired from the manufacturers in advance. After receiving the device information, the router searches the database for the feature information that matches the device information.

Alternatively, according to Mode A3, the steps of determining the feature information comprises: in response to the acquired device information, sending to the first terminal device a request for acquiring the feature information of the first terminal device; receiving from the first terminal device a response that includes the feature information of the first terminal device.

Alternatively, according to Mode A4, the steps of determining the feature information comprises: searching form a network side for the feature information on the basis of the device information. The method can be a channel for widely acquiring the feature information from network.

In the step 104, there are many methods for outputting the acquired feature information. For example, Mode B1 displays the acquired feature information. If the router contains a display, the feature information can be shown directly. Another Mode B2, for instance, is to send the acquired feature information to a second terminal device. The Mode B2 can have an increase in the transmission distance of the feature information. The feature information is transmitted to the second terminal device at a remote location.

Figure 1:
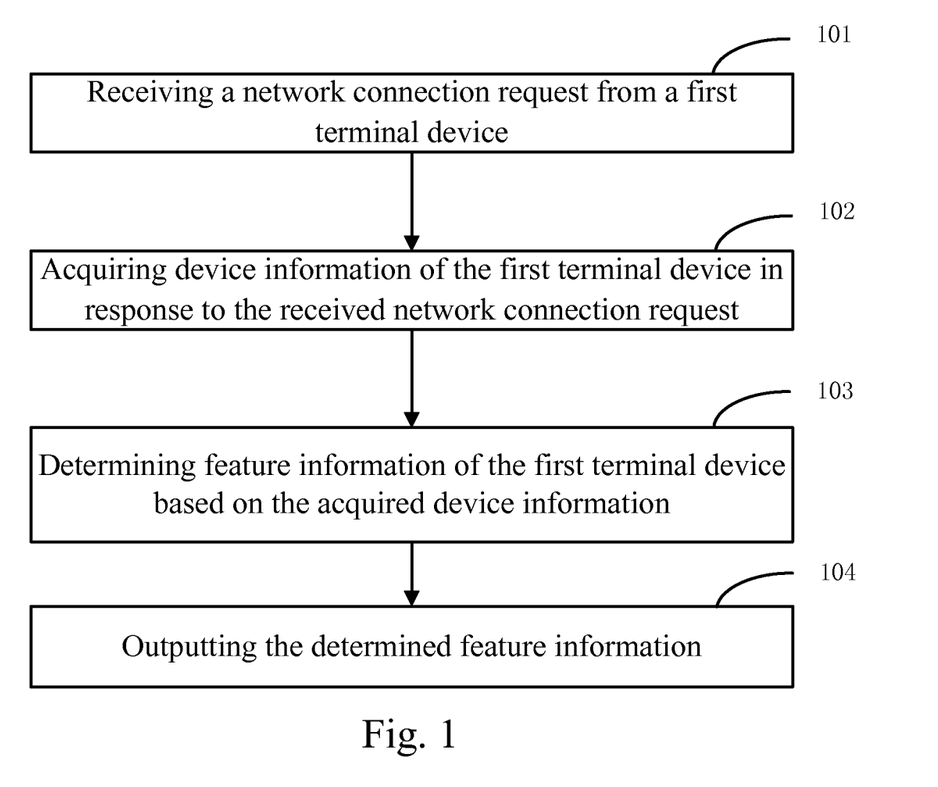
FIG. 1 is a flowchart of a method for acquiring feature information according to an exemplary embodiment of the present disclosure.

Various methods of implementing each step in the embodiment shown in FIG. 1 are described above. The embodiments below show the details of the implementation.

Figure 2:
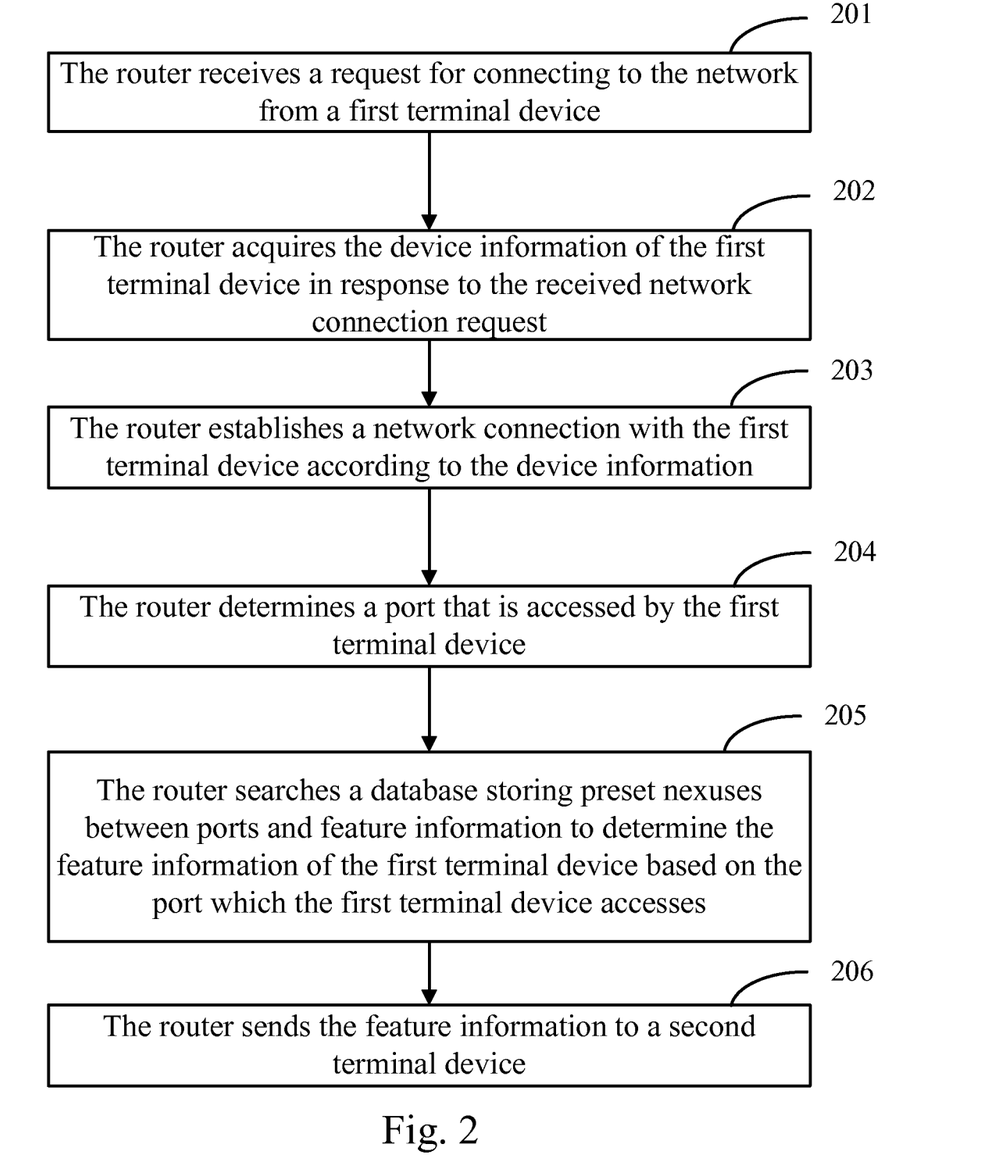
FIG. 2 is a flowchart of a method for acquiring feature information using port according to an exemplary embodiment of the present disclosure.

In an embodiment, the method is implemented by a router. As shown in FIG. 2, the method of acquiring the feature information through a port includes the steps as below.

In the step 201, the router receives the request for connecting to the network from the first terminal device. The first terminal device can be a smartphone, a tablet computer, a personal computer, a television, a set-top box, etc.

In the step 202, the router acquires the device information of the first terminal device in response to the received network connection request.

The device information can have a globally unique MAC address.

In the step 203, the router establishes a network connection with the first terminal device according to the acquired device information.

In the step 204, the router determines the port that is accessed by the first terminal device.

In the step 205, the router searches a database storing preset nexuses between ports and feature information to determine the feature information of the first terminal device based on the port which the first terminal device accesses.

In the step 206, the determined feature information is sent to the second terminal device.

After the router establishes the network connection with the first terminal device, each port can be scanned and the port which has been accessed by the first terminal device can be recorded. The router determines the feature information of the first terminal device in accordance with the port that is accessed by first terminal device and then sends the feature information to the second terminal device, wherein the router is configured to have an identification of the second terminal device in advance. In the present embodiment, the data quantity of the corresponding relation between the port and the feature information are less. It is easier for establishing the corresponding relation. The searching procedure is faster. Also, the router storage space occupied is smaller.

In an embodiment, the method is implemented by the router. As shown in the FIG. 3, the method for acquiring the feature information in accordance with the device information may include the steps described as below.

Figure 3:
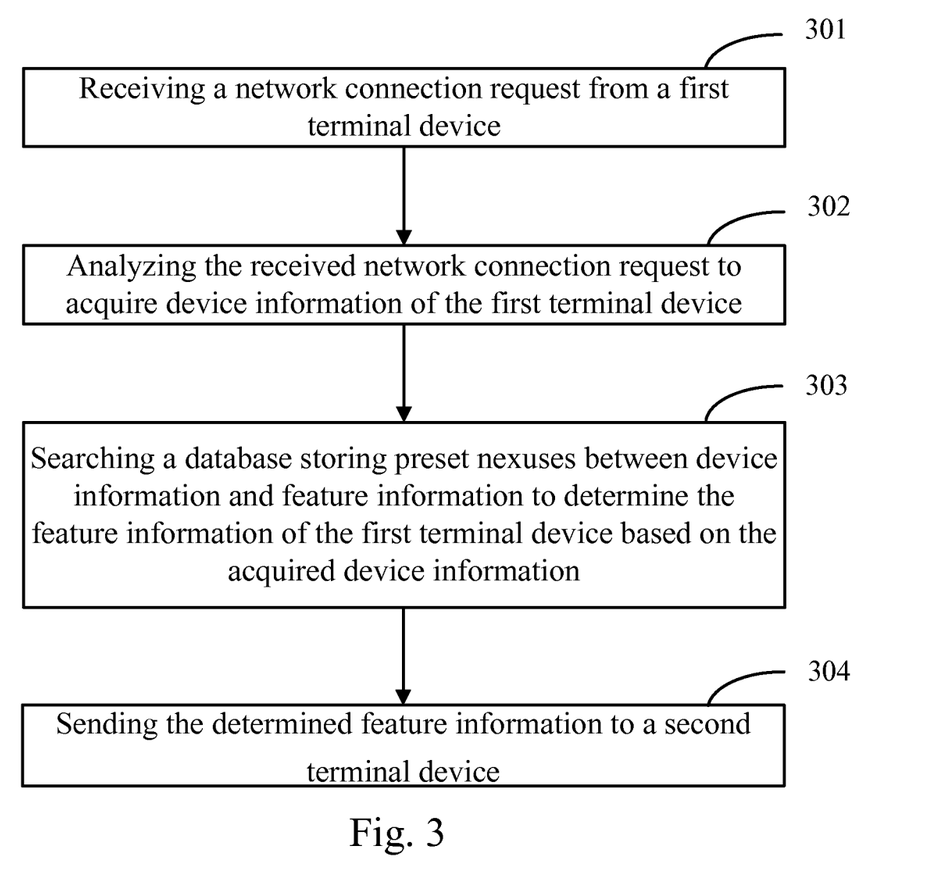
FIG. 3 is a flowchart of a method for acquiring feature information using device information according to an exemplary embodiment of the present disclosure.

The step 301 is to receive the network connection request from the first terminal device.

The step 302 is to acquire device information of the first terminal device in response to the received network connection request.

The step 303 is to search a database storing preset nexuses between device information and feature information to determine the feature information of the first terminal device based on the acquired device information.

The step 304 is to send the determined feature information to the second terminal device.

In the embodiment, the corresponding nexus between the device information and feature information is established using various channels in advance. The feature information may include: user name information, operation system information, brand information, equipment type information, manufacturer information, usage information, and application name information. For instance, the user name information is XX-IOS6. XX is a short name of the user who holds the first terminal. The IOS6 is the operation system information. The user name information is the user name registered to the first terminal device by the user. The operation system information is for example IOS6. The brand information, for example, is Apple, Samsung, etc. The equipment type information, for example, is I9500, etc. The manufacturer information, for example, is Apple, Samsung, etc. The manufacturer information can be the same as the brand information. The usage information, for example, is the smartphone and tablet computer, etc. The usage information can be included in the equipment type information. The application name information, for example, is the name information of the stationary application corresponding to the accessed port.

In the embodiment, the data of corresponding nexuses between device information and feature information is in large quantity, more comprehensive and accurate than the nexus as shown in FIG. 2.

Figure 4:
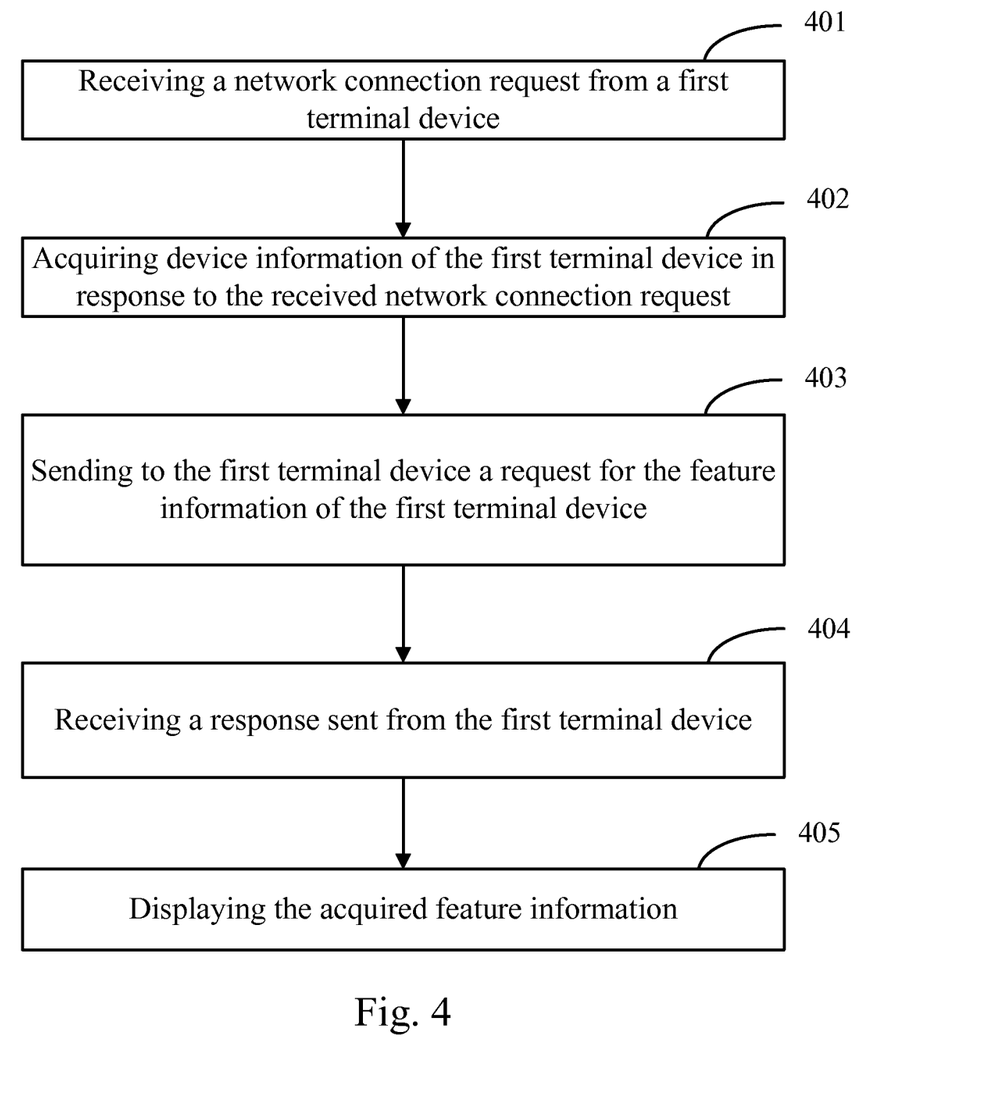
FIG. 4 is a flowchart of a method for acquiring feature information using communication according to an exemplary embodiment of the present disclosure.

In another embodiment, the method is implemented by a router. As shown in FIG. 4, the method for acquiring the feature information in accordance with the communication may include steps described as below.

The step 401 is to receive the network connection request from the first terminal device.

The step 402 is to acquire device information of the first terminal device in response to the received network connection request.

The step 403 is to send to the first terminal device a request for the feature information of the first terminal device in accordance with the acquired device information.

The step 404 is to receive a response sent from the first terminal device. The request response includes the feature information of the first terminal device.

The step 405 is to display the acquired feature information.

In the embodiment, the router actively sends the acquiring request to the first terminal device to request for acquiring the feature information of the first information device. The response from the first terminal device carries the feature information. The method does not need to establish the corresponding nexus in advance compared with the embodiments shown in the FIG. 2 and FIG. 3. It can save the storage space and simplified the searching procedure. Also, the acquired feature information is more accurate. The feature information includes: user name information, operation system information, brand information, equipment type information, manufacturer information, usage information, and application name information. In addition, the acquiring request can further include the information types for requesting to acquire one or more types of information in the feature information. The response from the first terminal device carries the corresponding feature information according to the information type. For instance, if the information type in the acquiring request represents the user name information, the request response from the first terminal device carries the user name information.

The procedure of acquiring the feature information can be understood according to the description above. The procedure can be implemented by an apparatus. The internal configuration and function of the apparatus is described as follows.

Figure 5:
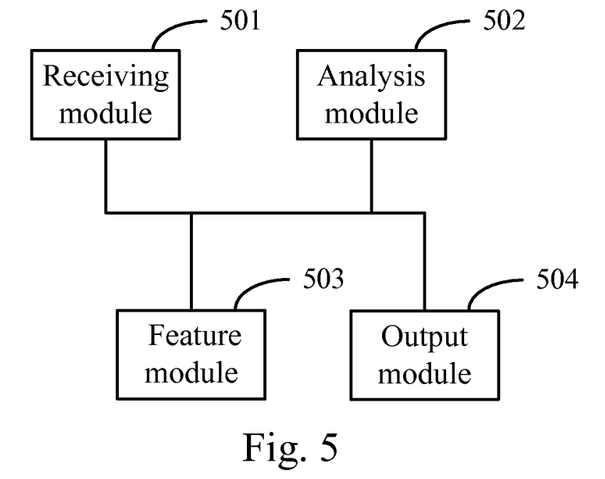
FIG. 5 is a block diagram of an apparatus for acquiring feature information according to an exemplary embodiment of the present disclosure.

In an embodiment, as shown in FIG. 5, the apparatus for acquiring the feature information may include: a receiving module 501, an analysis module 502, a feature module 503, and an output module 504.

The receiving module 501 is configured to receive the network connection request sent from the first terminal device.

The analysis module 502 is configured to acquire device information of the first terminal device in response to the received network connection request. The device information may include: the media access control (MAC) address information and/or the port information.

The feature module 503 is configured to determine the feature information of the first terminal device based on the acquired device information. The feature information may include: one or more items of user name information, operation system information, brand information, equipment type information, manufacturer information, usage information, and application name information.

The output module 504 is configured to output the determined feature information.

Figure 6A:
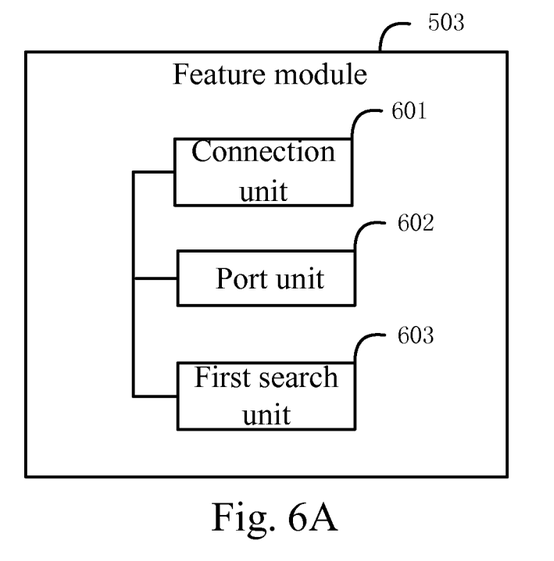
FIG. 6A is a block diagram of a feature module according to the first exemplary embodiment of the present disclosure.

In another embodiment, referring to FIG. 6A, the feature module 503 may include: a connection unit 601, port unit 602, and a first search unit 603.

The connection unit 601 is configured to establish network connection with the first terminal device on the basis of the device information.

The port unit 602 is configured to determine the port which the first terminal device accesses.

The first search unit 603 is configured to search a database storing preset nexuses between ports and feature information to determine the feature information of the first terminal device based on the port which the first terminal device accesses.

Figure 6B:
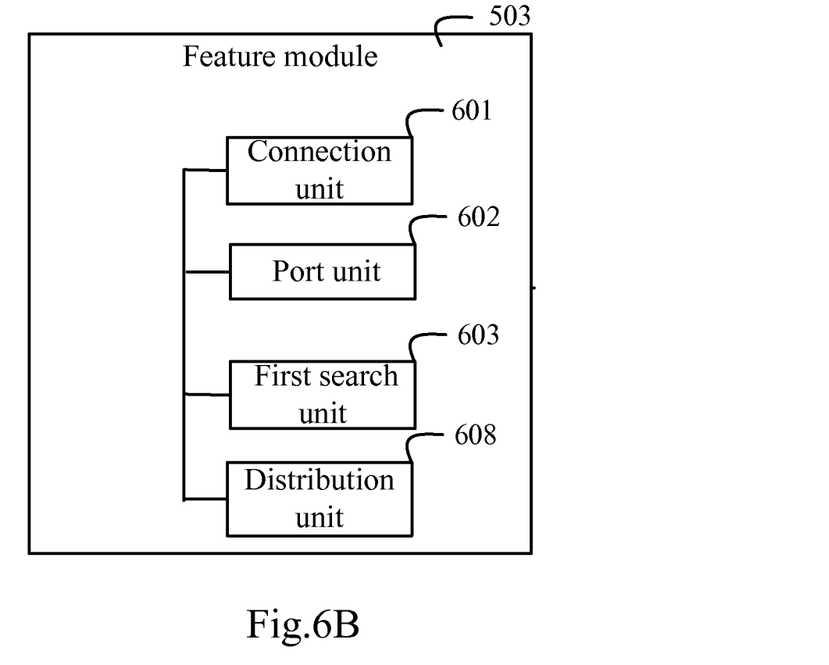
FIG. 6B is a block diagram of a feature module according to the second exemplary embodiment of the present disclosure.

In another embodiment, as shown in FIG. 6B, the feature module 503 may include: a distribution unit 608 is configured to distribute the final feature information of the first terminal device in accordance with the determined feature information.

Figure 7:
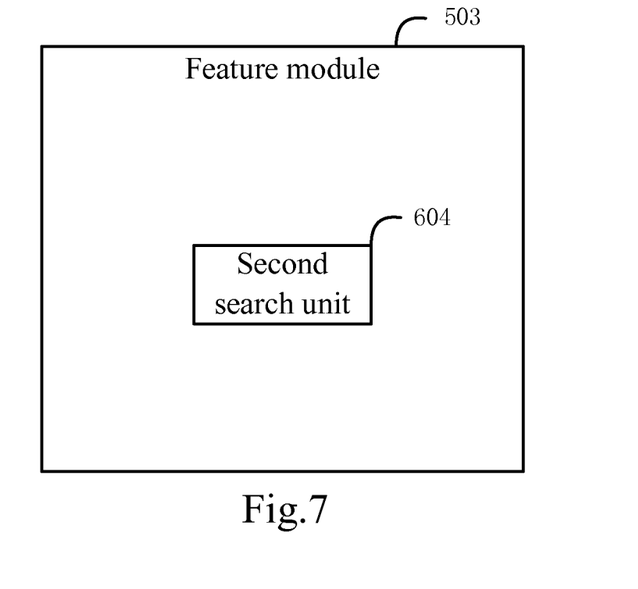
FIG. 7 is a block diagram of a feature module according to the third exemplary embodiment of the present disclosure.

In another embodiment, as shown in FIG. 7, the feature module 503 may include: a second search unit 604.

The second search unit 604 is configured to search a database storing preset nexuses between device information and feature information to determine the feature information of the first terminal device based on the determined device information.

Figure 8A:
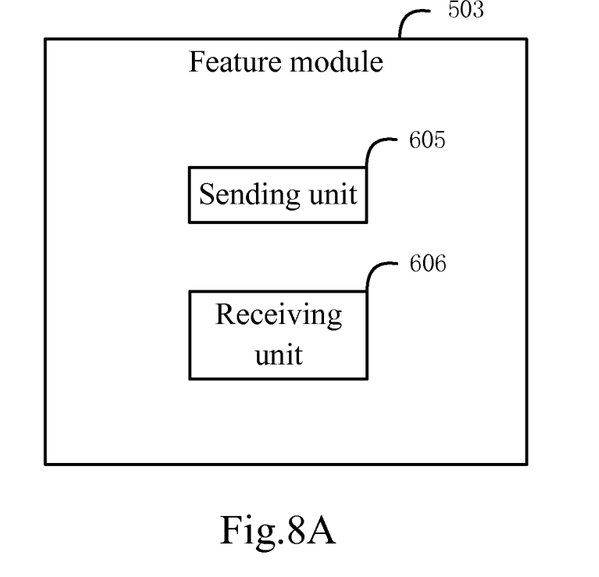
FIG. 8A is a block diagram of a feature module according to the fourth exemplary embodiment of the present disclosure.

In another embodiment, as shown FIG. 8A, the feature module 503 may include: a sending unit 605 and a receiving unit 606.

The sending unit 605 is configured to send a request to the first terminal device in accordance with the acquired device information for acquiring the feature information of the first terminal device.

The receiving unit 606 is configured to receive from the first terminal device a response. The response may include the feature information of the first terminal device.

Figure 8B:
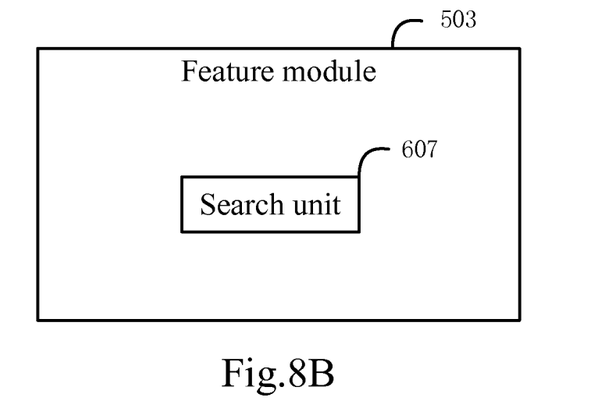
FIG. 8B is a block diagram of a feature module according to the fifth exemplary embodiment of the present disclosure.

In another embodiment, as shown FIG. 8B, the feature module 503 may include: a search unit 607 configured to search for the feature information corresponding to the device information from the network side.

Figure 9:
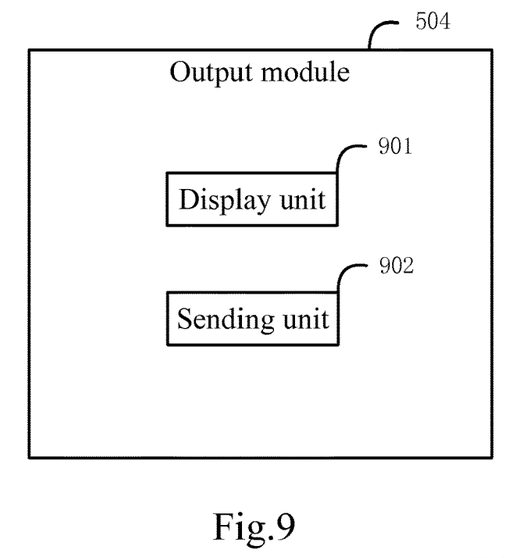
FIG. 9 is a block diagram of an output module according to an exemplary embodiment of the present disclosure.

In another embodiment, as shown FIG. 9, the output module 504 may include: a display unit 901 or a sending unit 902.

The display unit 901 is configured to display the determined feature information. The sending unit 902 is configured to send the determined feature information to the second terminal device.

Figure 10:
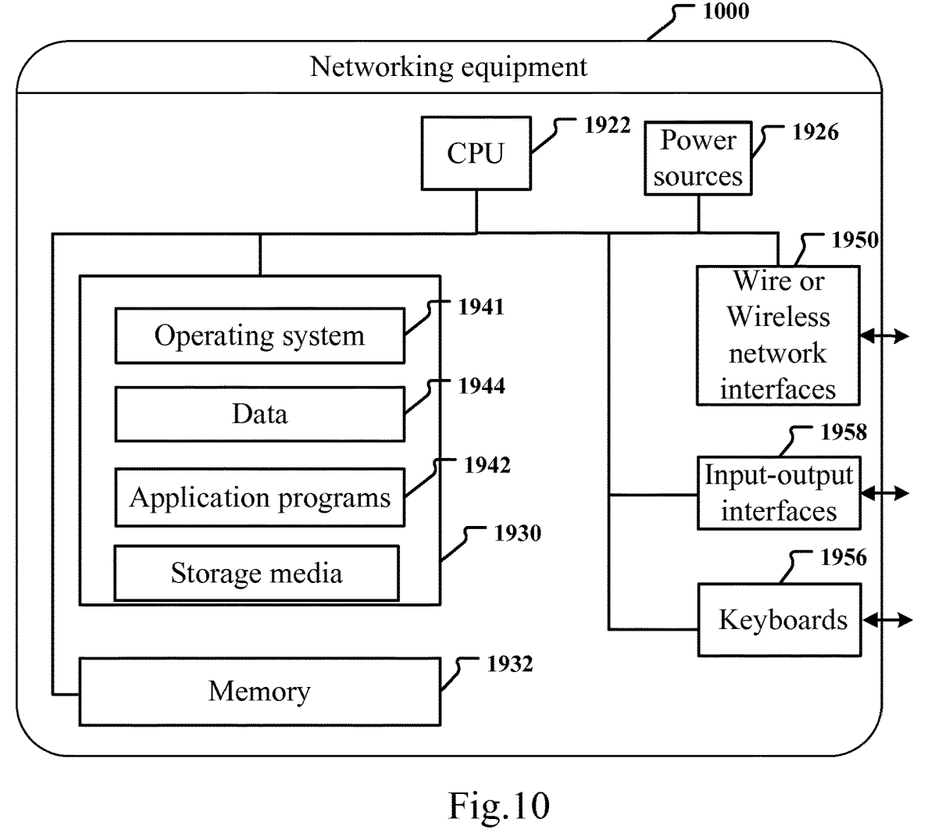
FIG. 10 is a block diagram of a networking equipment according to an exemplary embodiment of the present disclosure.

FIG. 10 is a block diagram illustrating a networking equipment according to an embodiment of the present disclosure. The networking equipment 1000 varies due to different configuration or properties, and may include one or more CPU (central processing unit) 1922 (e.g., one or more processors) and a memory 1932, one or more storage media 1930 storing application programs 1942 or data 1944 (e.g., one or more mass storage mediums). The memory 1932 and the storage medium 1930 may store temporarily or permanently. The program stored in storage medium 1930 may include one or more modules (not shown in this drawing), each module may include a series of instructions for operating the networking equipment. Further, the CPU 1922 may be configured to communicate with the store medium 1930, a series of instructions of the storage medium 1930 are executed on the server 1900.

The networking equipment 1000 may also include one or more power sources 1926, one or more wired or wireless network interfaces 1950, one or more input-output interfaces 1958, one or more keyboards 1956, and/or one or more operating systems 1941 such as Windows Server™, Mac OS X™, Unix™, Linux™, FreeBSD™ and the like.

The networking equipment 1000, which may be the router as the networking equipment, may include a memory and one or more programs stored in the memory, wherein the one or more programs are configured to be executed by one or more processors, and include instructions of performing the following operations: receiving a network connection request sent from a first terminal device; acquiring device information of the first terminal device in response to the received network connection request; determining feature information of the first terminal device based on the acquired device information; and outputting the acquired feature information. In some exemplary embodiments, the memory may further include one or more instruction modules further configured to execute steps described in the above FIG. 2-4.

According to an embodiment of the present disclosure, the feature information of the first terminal device can be acquired through network connection, and output to the users. This allows the users to recognize the first terminal devices connected to the network, thereby implement some processes related to the first terminal device, for instance, permitting or refusing the first terminal device to connect with the network. The present disclosure provides various methods of acquiring and outputting the feature information. They can be applied to various circumstances depending on actual needs.

In addition, typically the mobile terminal device described in the present disclosure may be various handheld mobile terminal devices such as smartphone and personal digital assistant (PDA), etc. Therefore, the scope of the present disclosure is not to be limited to a certain type of mobile terminal device.

In addition, the method according to the present disclosure may further be implemented by a CPU executable computer program. When the computer program is executed by the CPU, the above functions defined in the method of the present disclosure are executed.

In addition, the above steps in the method and the units in the system may be implemented by a controller and a computer readable storage medium configured to store the computer programs for the controller to achieve the functions of the above steps or units.

In addition, it should be understood that, the computer readable storage medium (for example, a memory) described by the present disclosure may be a volatile memory or a nonvolatile memory, or may include both of the volatile memory and the nonvolatile memory. As an example without limitation, the nonvolatile memory may include a read-only memory (ROM), a programmable ROM (PROM), an electrically programmable read-only memory ROM (EPROM), an electrically erasable programmable ROM (EEPROM) or a flash memory. The volatile memory may include a random access memory (RAM), which may function as an external cache memory. As an example without limitation, the RAM may be obtained in various kinds such as a synchronous RAM (SRAM), a dynamic RAM (DRAM), a synchronous DRAM (SDRAM), a double data rate SDRAM (DDR SDRAM), an enhanced SDRAM (ES-DRAM), a synchronous link DRAM (SLDRAM) and a directly Rambus RAM (DRRAM). The storage medium in the disclosed aspect intends to include but not to be limited by those and other proper types of memories.

It should be understood by those skilled in the art that, the various exemplary logic blocks, modules, circuits and algorithm steps described in conjunction with the disclosure herein may be implemented by electronic hardware, computer software or the combination of both. In order to clearly explain the interchangeability of the hardware and the software, it has been generally illustrated with respect to the functions of the various exemplary members, blocks, modules, circuits and steps. Whether such functions are implemented by software or hardware depends on the specific application and the design restriction applied to the whole system. Those skilled in the art may achieve the functions in many ways for respective specific applications, but such determining of the achievement may not be explained as departing from the scope of the present disclosure.

By using the following components designed to execute the functions described herein, the various exemplary logic blocks, modules and circuits described in conjunction with the disclosure herein may carry out or execute: a general-purpose processor, a digital signal processor (DSP), a specific integrated circuit (ASIC), a field programmable gate array (FPGA) or other programmable logic devices, a discrete gate or transistor logic, a discrete hardware assemble or any combination of those components. The general-purpose processor may be a microprocessor. However, alternatively, the processor may be any of traditional processors, controllers, microcontrollers or state machines. The processor may also be implemented by a combination of the computing devices such as a combination of a DSP and a microprocessor, a plurality of microprocessors, one or more microprocessors in conjunction with DSP core, or any other those kind of configurations.

The method or algorithm steps described in conjunction with the disclosure herein may be directly included in the hardware, in the software modules executed by the processor or in the combination of both. The software modules may host in a RAM memory, a flash memory, a ROM memory, an EPROM memory, an EEPROM memory, a register, a hard disc, a movable disc, a CD-ROM, or any of other kind of storage medium known in the art. The exemplary storage media are coupled to the processor, so that the processor can read/write information from/to the storage media. In an alternative aspect, the storage media may be integrated with the processor. The processor and the storage media may host in an ASIC. The ASIC may host in a user terminal. In an alternative aspect, the processor and the storage media may host in a user terminal as a discrete assembly.

In one or more exemplary designs, the function may be implemented in hardware, software, firmware or any combinations thereof. If it is implemented in software, the function may be stored in the computer readable media or transferred via the computer readable media as one or more instructions or codes. The computer readable media may include a computer storage medium and a communication medium, wherein the communication medium may include any medium which is helpful for transferring the computer program from one site to another site. The storage media may be any usable medium accessible by a general or dedicated computer. As an example without limitation, the computer readable media may include RAM, ROM, EEPROM, CD-ROM or other CD storage mediums, disc storage mediums or other magnetic storage mediums, or may be any other media for carrying or storing the required program code in form of instructions or data structure accessible by a general or dedicated computer or a general or dedicated processor. In addition, any kind of connection may be properly referred as a computer readable medium. For example, if software is sent from a website, a server or other distant sources with a coaxial cable, an optical fiber cable, a twisted-pair, or a digital user line (DSL), or with the wireless technology such as infrared, radio wave or microwave, those above coaxial cable, optical fiber cable, twisted-pair, DSL or the wireless technology such as infrared, radio wave and microwave are all included in the definition of media. As used herein, the magnetic disk and optical disk may include a compact disk (CD), a laser disk, an optical disk, a digital versatile disk (DVD), a floppy disk or a blue-ray disk, wherein the magnetic disk usually represents data magnetically, and the optical disk usually represents data optically by using a laser. The combination of the above components may also be included in the scope of the computer readable media.

Although the exemplary embodiments of the present disclosure are illustrated in the contents of the present disclosure as above, it should be noted that various variations and modifications may be available without departing from the scope of the present disclosure defined by the claims. According to the functions of the method claims in the disclosed embodiments described herein, steps and/or actions are not executed in any specific sequence. In addition, although the element in the present disclosure may be described or required individually, it may be conceived as plural, unless being clearly defined as single.

The objects, technical solutions, and advantageous effects have been given with reference to the above embodiments. It should be understood the above description are only certain embodiments of the present disclosure, which are not used to limit the present disclosure. Various variations, identical substitutions and modifications made within the spirit and principles of the present disclosure shall be involved in the scope of the present disclosure.

What is claimed is:

1. A method for acquiring feature information of a first terminal device trying to connect to a networking equipment, comprising:
   receiving, by the networking equipment, a network connection request from the first terminal device;

acquiring, by the networking equipment, device information of the first terminal device in response to the received network connection request;

establishing, by the networking equipment, a network connection with the first terminal device on the basis of the acquired device information;

determining, by the networking equipment, a port which the first terminal device accesses;

searching, by the networking equipment, a database storing preset nexuses between ports and featured application to determine the featured application of the first terminal device based on the port which the first terminal device accesses;

searching, by the networking equipment, a database storing preset nexuses between featured application and operation system to determine the operation system of the first terminal device based on the featured application of the first terminal device;

searching, by the networking equipment, a database storing preset nexuses between operation system and feature information to determine the feature information of the first terminal device based on the operation system of the first terminal device accesses; and outputting, by the networking equipment, the determined feature information;

wherein the feature information is used for identifying the first terminal device.

2. The method of claim 1, wherein determining the feature information of the first terminal device comprises:

searching a database storing preset nexuses between device information and feature information to determine the feature information of the first terminal device based on the acquired device information.

3. The method of claim 1, wherein determining the feature information of the first terminal device comprises:

sending, to the first terminal device, a request for acquiring the feature information; and receiving, from the first terminal device, a response comprising the feature information.

4. The method of claim 1, wherein determining the feature information of the first terminal device comprises:

searching from a network side for the feature information on the basis of the device information.

5. The method of claim 1, wherein outputting the determined feature information comprises:

displaying the determined feature information.

6. The method of claim 1, wherein outputting the determined feature information comprises:

sending the determined feature information to a second terminal device.

7. The method of claim 1, wherein the device information comprises at least one of media access control (MAC) address information and port information.

8. The method of claim 1, wherein the feature information is selected from a group of user name information, operation system information, brand information, equipment type information, manufacturer information, usage information, and application name information.

9. A networking equipment, comprising:

a memory; and one or more programs stored in the memory, wherein the one or more programs are configured to be executed by one or more processors, and comprise instructions of performing the following operations:

receiving a network connection request from a first terminal device;

acquiring device information of the first terminal device in response to the received network connection request;

establishing a network connection with the first terminal device on the basis of the acquired device information;

determining a port which the first terminal device accesses;

searching a database storing preset nexuses between ports and featured application to determine the featured application of the first terminal device based on the port which the first terminal device accesses;

searching a database storing preset nexuses between featured application and operation system to determine the operation system of the first terminal device based on the featured application of the first terminal device;

searching a database storing preset nexuses between operation system and feature information to determine the feature information of the first terminal device based on the operation system of the first terminal device accesses; and outputting the acquired feature information;

wherein the feature information is used for identifying the first terminal device.

10. The networking equipment of claim 9, wherein determining the feature information of the first terminal device comprises:

searching a database storing preset nexuses between device information and feature information to determine the feature information of the first terminal device based on the acquired device information.

11. The networking equipment of claim 9, wherein determining the feature information of the first terminal device comprises:

sending, to the first terminal device, a request for acquiring the feature information; and receiving, from the first terminal device, a response comprising the feature information.

12. The networking equipment of claim 9, wherein determining the feature information of the first terminal device comprises:

searching from a network side for the feature information on the basis of the device information.

13. The networking equipment of claim 9, wherein outputting the determined feature information comprises:

displaying the determined feature information.

14. The networking equipment of claim 9, wherein outputting the determined feature information comprises:

sending the determined feature information to a second terminal device.

15. The networking equipment of claim 9, wherein the device information comprises at least one of media access control (MAC) address information and port information.

16. A non-transitory storage medium having stored therein instructions that, when executed by one or more processors of a networking equipment, causes the networking equipment to perform:

receiving a network connection request from a first terminal device;

acquiring device information of the first terminal device in response to the received network connection request;

establishing a network connection with the first terminal device on the basis of the acquired device information;

determining a port which the first terminal device accesses;

searching a database storing preset nexuses between ports and featured application to determine the featured application of the first terminal device based on the port which the first terminal device accesses;

searching a database storing preset nexuses between featured application and operation system to determine the operation system of the first terminal device based on the featured application of the first terminal device;

searching a database storing preset nexuses between operation system and feature information to determine the feature information of the first terminal device based on the operation system of the first terminal device accesses; and outputting the determined feature information;

wherein the feature information is used for identifying the first terminal device.

* * * * *